United States Patent [19]

Collin

[11] 4,051,679

[45] Oct. 4, 1977

[54] MARINE PROPULSION PLANT WITH REVERSIBLE PROPELLER SHAFT CONNECTED THERETO

[75] Inventor: Lars Thorbjörn Collin, Molndal, Sweden

[73] Assignee: Lars Collin Consult AB, Vasterbergsgatan, Sweden

[21] Appl. No.: 667,341

[22] Filed: Mar. 16, 1976

Related U.S. Application Data

[63] Continuation of Ser. No. 595,228, July 11, 1975, abandoned, which is a continuation of Ser. No. 422,845, Dec. 7, 1973, abandoned.

[30] Foreign Application Priority Data

Aug. 19, 1972 Sweden .............................. 7216003

[51] Int. Cl.² ...................... B63H 23/08; F01K 13/02
[52] U.S. Cl. ................................ 60/656; 60/39.16 S; 60/629; 74/DIG. 8; 115/34 R; 192/4 C
[58] Field of Search ................ 115/34 R; 60/39.16 R, 60/39.16 S, 629, 656; 192/4 C; 74/DIG. 8

[56] References Cited

U.S. PATENT DOCUMENTS

| 2,741,351 | 4/1956 | Fletcher et al. | 115/34 R |
| 3,037,348 | 6/1962 | Gassmann | 60/39.16 S |
| 3,173,255 | 3/1965 | Kronogard | 60/39.16 R |
| 3,363,732 | 1/1968 | Nakamura et al. | 192/4 C |
| 3,488,947 | 1/1970 | Miller et al. | 60/39.16 S |
| 3,762,161 | 10/1973 | Pennig | 60/39.16 S |

FOREIGN PATENT DOCUMENTS 624,180  5/1949  United Kingdom .............. 115/34 R Primary Examiner—Trygve M. Blix
Assistant Examiner—Gregory W. O'Connor
Attorney, Agent, or Firm—Holman & Stern

[57] ABSTRACT

When reversing a marine power plant, due consideration must be given to the fact that the inertia of the ship will continue to force the ship through the water during a moment of time after the shut down of the prime mover, with the propeller then acting as a water turbine tending to rotate the propeller shaft in the same direction as before. If the propulsion plant includes a gas turbine and a reversing gear, the reversing gear is designed in such a manner that the part thereof connected to the turbine will represent, in use, a smaller inertia than the part connected to the propeller shaft, with the propeller shaft together with the propeller attached thereto representing a considerable rotating body. By suitable selection of the means engaging the parts of the reversing gear in their respective working positions for ahead and astern running, respectively, it will be possible to disengage the turbine part of the gear, to brake this part and then to re-engage the gear parts in their new relative position, thereafter braking the propeller connected part by the power of the turbine and finally bringing the whole system to rotate in the desired direction.

2 Claims, 9 Drawing Figures

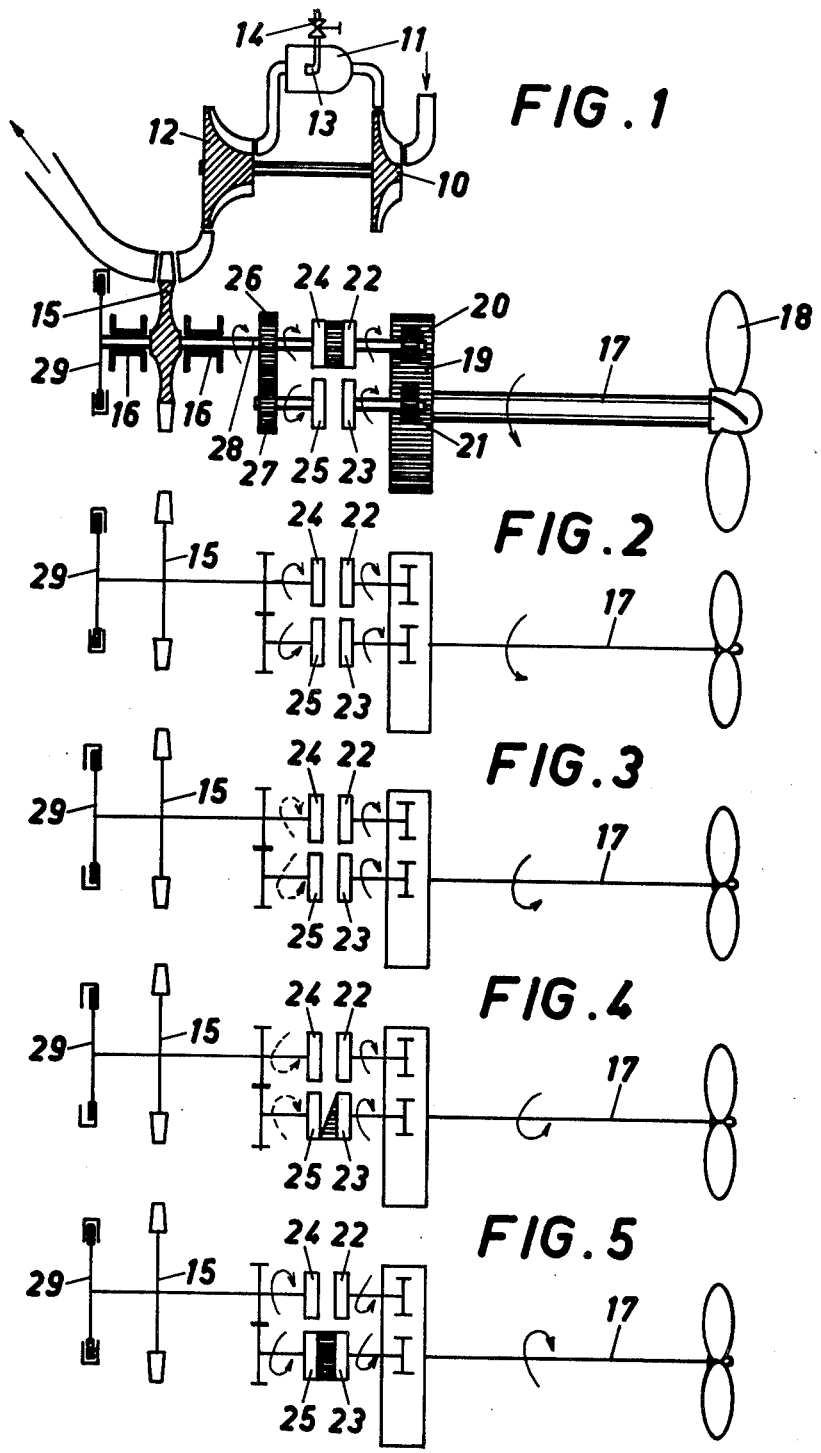

MARINE PROPULSION PLANT WITH REVERSIBLE PROPELLER SHAFT CONNECTED THERETO

This is a continuation of application Ser. No. 595,228, filed July 11, 1975, now abandoned, which in turn is a continuation of U.S. Ser. No. 422,845, filed Dec. 7, 1973, and now abandoned.

BACKGROUND OF THE INVENTION

When designing high output marine propulsion machineries, the reversing has hitherto been a limiting factor. Certain engine types of prime movers are designed to be directly reversible so they can supply the required output in both directions of rotation. Other machineries, as for instance turbines, do not possess such properties, while, with a third type, reversing is possible, constructional and operational complications make it more convenient to reverse by other means than the power unit itself.

Many gears with reversing facilities are very expensive, and have, for that reason, mainly been installed in warships. With steam turbines, the reversing problem has been solved by providing separate astern-turbines. Reversible gears have been proposed, in which the torque is transferred to different combinations of gears by means of hydraulic clutches being filled and emptied, and in turn connecting the machinery to the propeller via different gearways.

It has also been proposed, during a reversing operation, to reduce the torque acting upon the gear to about zero, by means of brakes mounted at the propeller shaft. As long as the ship is moving through the water, the propeller must also be braked which imposes a heavy load upon the brake.

SUMMARY OF THE INVENTION

The present invention relates to marine propulsion plants, in which the prime mover is a gas turbine, and which includes a reversing gear comprising a first part mechanically connected to the turbine and a second part connected to the propeller shaft, as well as means to maintain said parts in either of two different working conditions, for ahead and astern running, respectively. The plant is provided with means to govern the flow of motive fluid to the turbine, as well as for braking the turbine and the part of the reversing gear connected thereto. The turbine rotor is carried in bearings permitting the rotation thereof in two different directions, and there are means at the reversing gear permitting transfer of torque the usual way from the turbine to the propeller shaft, but also in the opposite direction.

The parts of the reversing gear are preferably designed in such a manner, that the turbine rotor and the gear part connected thereto will, in use, represent a considerably smaller inertia than the propeller shaft and the rotatable elements connected thereto, which means that it will be comparatively easy to brake the turbine after removing the supply of motive fluid thereto, and then to re-engage the gear parts. The turbine will then be forced to rotate "backwards" by the inertia of the propeller shaft, but the latter will first be braked and then brought to rotate in the new direction, when motive fluid is re-applied to the turbine.

BRIEF DESCRIPTION OF THE DRAWINGS

FIG. 1 shows schematically a marine propulsion plant including a gas turbine and a reversing gear, FIGS. 2-5 show, still more schematically, the relative rotating directions of the components of the gear during various steps in a reversing operation.

BRIEF DESCRIPTION OF SOME PREFERRED EMBODIMENTS

Figure 6:
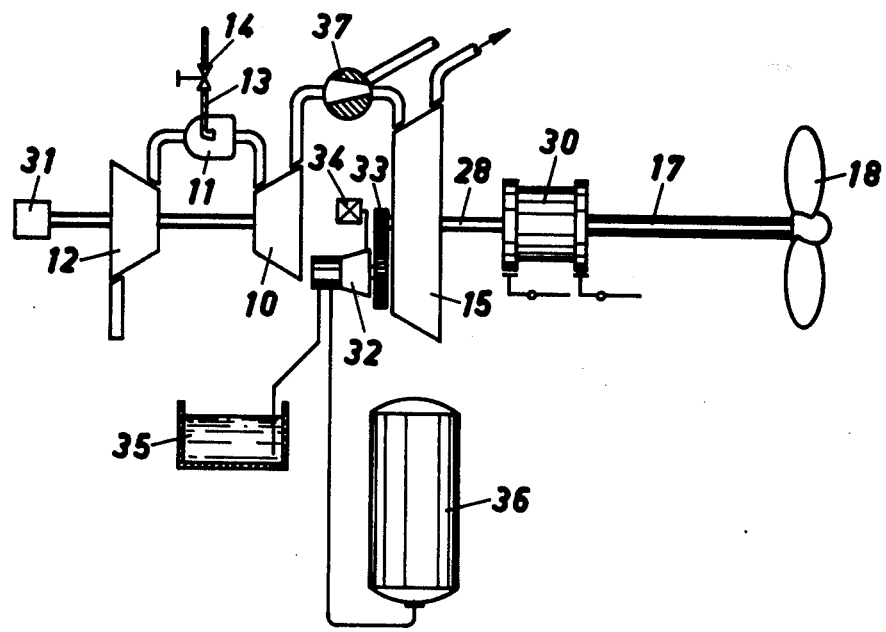
FIG. 6 shows a further embodiment of a marine propulsion plant according to the invention.

The marine propulsion plant illustrated in FIG. 1 comprises a gas generating portion including a compressor 10, a combustion chamber 11 and a first turbine 12 driving the compressor. The combustion chamber is provided with a burner 13 having means 14 for governing the generation of motive fluid to a main, or propulsion turbine 15.

This is shown as a single stage unit, but it is evident that, depending upon the power to be generated and other well known factors determing the general layout of the plant, several expansion stages may be provided, and that more than one gas generating unit may be included in the plant.

The turbine rotor is carried in bearings 16, which contrary to the design common with known gas turbines are arranged in a manner to permit the turbine to rotate in opposite directions.

The turbine is, by means of a reversing gear, the function of which is to be described herebelow, connected to a propeller shaft 17 to the end of which a propeller 18 is mounted. Depending upon the size of the ship, the propeller shaft may be composed of a number of interconnected lengths of shafting.

A large gear wheel 19 is fitted to the forward end of the propeller shaft 17. Two pinions 20 and 21 mesh with this large wheel, and each of said pinions is connected by shafts 20a and 21a to one half-portion 22 and 23, respectively, of a clutch means.

The other two half-portions 24 and 25 of said clutch means are connected to two intermeshing pinions 26 and 27, the pinion 26 as well as the pertaining half-portion 24 of the clutch being mounted upon an output shaft 28 of the turbine 15 and the pinion 27 in a shaft 27a parallel to the outward shaft.

A brake 29 is fitted to the forward end of the turbine output shaft 28.

Clutch portions 24/22 cooperate for one direction of the propeller shaft and clutch portions 25/23 cooperate for the opposite direction of rotation. Both clutches may be disengaged simultaneously, leaving the turbine part completely free of the propeller shaft.

FIG. 1 indicates an engagement of clutch portions 24 and 22, which means that elements 26, 24, 22, 20, 21 and 23 rotate in the same direction, whereas elements 27 and 25 rotate in the opposite direction.

It should be noted that clutch portions 25 and 23 rotate in opposite directions, and it is evident that a reversing of the rotation of the propeller shaft cannot simply be brought about by disengaging clutch 24/22 and engaging clutch 25/23.

The main steps involved in a reversing operation are schematically illustrated in FIGS. 2–5. First of all, the supply of motive fluid to the turbine is cut off, and thereafter the clutch 24/22 is disengaged. The movement of the ship through the water will continue, and the propeller will acting as a water turbine driving the propeller shaft and the part of the gear mechanically connected thereto in the same direction as before.

The inertia of the turbine and the part of the gear mechanically connected thereto will also make these parts continue to rotate in the same direction as before, but no, or only an insignificant amount of power is supplied thereto, so the speed will be rapidly reduced.

As shown in FIG. 3, the brake is then applied and the turbine rotor is brought to stand still, or almost so.

It will now, as shown in FIG. 4, be possible gradually to engage clutch 25/23. The propeller shaft system is still rotating in the original direction, and an engagement of the second clutch will bring the turbine part of the gear to rotate "backwards". This imposes a load on the propeller shaft, which reduces its tendency to rotate.

When the second clutch is fully engaged, motive fluid is supplied to the turbine, which now rotates contrary to its normal working direction. The action of the motive fluid upon the rotor buckets will first fully brake the now interconnected system from the turbine to the propeller, and finally bring this to rotate in the new direction of rotation.

The braking of the turbine part separate from the propeller shaft will be greatly enhanced due to the fact that it is possible to design the turbine part in such a manner that the inertia thereof will be considerably less than that of the propeller shaft part. Even if the turbine rotates at much higher speed than the propeller shaft, the weight and size of the elements belonging to the turbine part are markedly less than those belonging to the propeller shaft.

The propulsion plant shown in FIG. 6 includes the same basic components as the one of FIG. 1, and like components are denoted by the same legends. There are thus the compressor 10, the combustion chamber 11 and the compressor turbine 12, as well as the burner 13 and its control means to form a motive fluid generating unit. The main turbine 15 is connected to the propeller shaft 17 by means of a reversible epicyclic gear 30, to be described in detail herebelow in connection with FIG. 8. A motor for starting the gas generating unit is denoted by 31.

The braking of the main turbine is here brought about partly by means of a hydraulic device including a machine 32 of the well known swash plate type, which can operate either as a pump or as a motor, and is driven by the turbine by way of a gear train 33. The inclination of the swash plate is determined by means of a device 34 of well known type.

The hydraulic machine is connected to a reservoir 35 for a hydraulic fluid, as well as to a pressure storage tank 36.

The hydraulic machine 32 is normally maintained in a neutral position, in which it performs no work and consumes very little energy. If there is a need for hydraulic pressure fluid within the power plant in general, the machine may, of course, be used to supply such fluid. We are, however, here concerned with the braking activity and will disregard such possibility.

During a reversing operation, and corresponding to the step illustrated in FIG. 3, the swash plate of the machine will be brought to a position turning the machine into a pump. This will draw fluid from the reservoir 35 and force it into the storage tank 36. The braking effect of the machine will cease when the counterpressure in the tank reaches a certain level, which to some extent will be determined by the capacity of the tank. It will be evident from the following description of the reversing gear 30 a certain braking effect is attainable therethrough also.

The pressure fluid stored in tank 36 may be used to aid the rotation of the turbine. The swash-plate of the machine 32 is then brought to a position turning the machine into a motor.

This may be switched in just before the step illustrated in FIG. 4, i.e. just when the turbine has been brought to a standstill, to start the turbine in its backwards rotation before clutch 25/23 is being engaged. If both clutch halves rotate in the same direction, although a different speed, the shock will be less than if one part is stationary. The motor may, however, also be switched in when the clutch is fully engaged in order to aid the turbine in braking the propeller shaft.

Certain types of gas generator units cannot be completely shut down, but must continue to generate some amount of gas. In order to prevent motive fluid being supplied to the main turbine 15 during the braking step, a bleed-off valve 37 is provided, by means of which any desired amount of motive fluid may be made to by-pass the main turbine.

Even if the reversing gear is of a type different from that in FIG. 1, the steps involved in the braking operation are basically the same.

Figure 7:
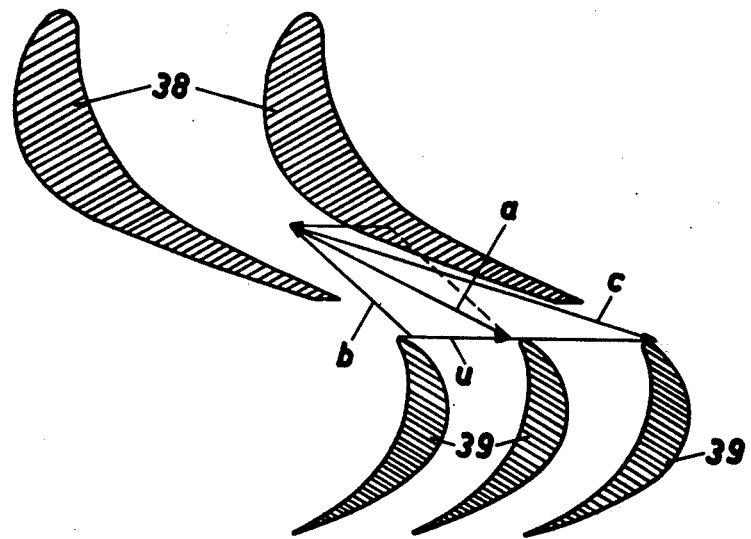
FIG. 7 is a section through a portion of the nozzle and bucket system of the gas turbine.

The fact that the turbine for a short moment will be rotated "backwards" greatly enhances its braking effect, as will appear in FIG. 7. The inlet guide vanes are denoted by 38 and the turbine buckets by 39.

The absolute inlet speed of the motive fluid is denoted by $a$ and the relative speed of rotor by $u$. This means that the relative speed and direction of the fluid entering the rotor buckets will have the magnitude denoted by $b$.

When the rotor is rotated "backwards", with about the same speed, the relative speed and direction of the fluid will correspond to $c$, which may be as much as twice the amount of $a$. With the gas generator operating at full output and by governing the supply of motive fluid to the main turbine by means of the bleed-off valve 37, this braking effect may be brought up from zero to full magnitude in a short interval of time.

Figure 8:
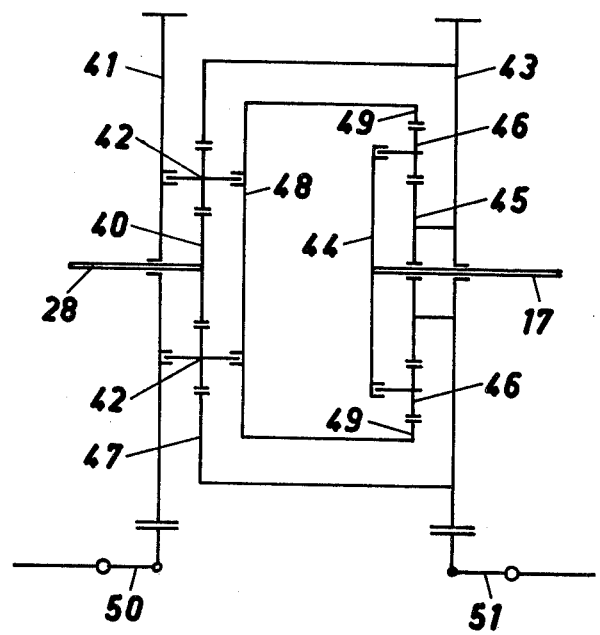
FIG. 8 shows, very schematically, the design of a reversible epicycling gear.

As a gear, any reversible reduction gear be used. For large outputs, the so called epicyclic gear has proven very useful, as it provides a high degree of reduction with comparatively small space requirements. Such a gear is schematically shown in FIG. 8.

A first sun wheel 40 is mounted upon the turbine output shaft 28 and a first rim wheel 41 is rotatably mounted thereon. This rim wheel carries a first set of planetary wheels 42, meshing with the sun wheel 40.

A second rim wheel 43 is rotatably mounted upon the propeller shaft 17 at the end of which a planetary carrier 44 is fitted. The second rim wheel 43 is provided with one external gear ring 45 serving as sun wheel for a second set of planetary gears 46 carried by the planetary carrier 44, as well as with an internal gear ring 47 cooperating with the first set of planetary gears 42. A gear wheel 48 having an internal gear ring 49 for cooperation with the second set of planetary gears 46 is carried by the first rim wheel 41 by means of the shafts of the first planetary gears 42.

Either of the two rim wheels may be kept stationary by means of locking devices 50 and 51, respectively. These may be of any well known type, but are here preferably also designed in such a manner that they may exert a braking effect upon the pertaining rim wheel. It is evident that when both locking devices are released, the turbine and the propeller shaft lack any torque transferring connection.

The function of the gear is as follows. Suppose first that rim wheel 41 is locked. The rotation of sun wheel 40 is then, by way of the first planetary gears 42, transferred to the second rim wheel 43 by way of its internal gear ring 47. The rotation of the second rim wheel is transferred to the propeller shaft 17 by way of the external gear ring 45 thereon, the second planetary gears 46 and the planetary carrier 44, with the internal gear wheel 48 being kept stationary by the first rim wheel 41.

If, instead the second rim wheel 43 is locked, the power is transferred from the first sun wheel 40 by way of the first planetary gears 42 to the internal gear wheel 48, - internal gear ring 47 being stationary. The internal gear wheel 48 directly cooperates with the second set of planetary wheels 46, and as also the external gear ring 45 is stationary, the torque is transferred directly to the planetary carrier 44.

Figure 9:
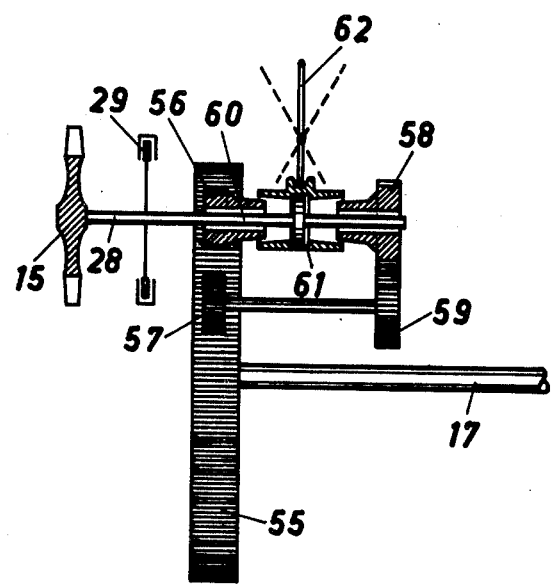
FIG. 9 shows a detail of the clutch means at a preferred embodiment of the reversing gear.

A reversing gear of above desired type has noted advantages with respect to the requirements for space. With respect to the braking properties, it is, as above mentioned, of importance that the part of the gear connected to the turbine be as small as possible. If that point is of major importance, a gear of the type shown in FIG. 9 may be used.

The gear will basically be of the same type as the one shown in FIG. 1, i.e. there is a large wheel 55 fitted to the end of the propeller shaft 17 and there are two pinions 56 and 57 engaging the same. Two meshing gear wheels 58 and 59 are provided at the side of the large wheel 55 remote from the turbine 15.

Gear wheel 59 is directedly connected to the pinion 57, but there is no direct mechanical connection between the gear wheel 58 and the pinion 56.

The shaft 28 of the turbine 15 is provided with a brake 29 and is continued by a quill shaft 60 passing through the pinion 56 and gear wheel 58. Intermediate the last mentioned elements, there is a clutch device 61, of arbitrary, known type which, by means of a governing device 62, may be kept in a neutral position, disengaging both elements, or which may connect the quill shaft to either of them.

It is evident that the rotating parts following the turbine during full disengagement of the clutch will be very small, and that the gear will operate in the same basic manner as described in connection with FIG. 1.

I claim:

1. In a propulsion plant including a propulsion shaft, a gas turbine having a rotor and an output shaft, means for supplying motive fluid to the turbine, a reversing gear means for connecting the turbine output shaft to the propulsion shaft, said gears means including a first portion connected to said turbine output shaft and a second part connected to said propulsion shaft, clutch means to engage and, during reversing, disengage said first and second parts, the improvement of a combination pump/motor hydraulic machine operably connected to the turbine rotor, an open reservoir for hydraulic fluid and a closed storage tank for pressure fluid, means for engaging the machine as a pump to the turbine rotor for braking the rotor during reversing by transporting hydraulic fluid from said reservoir to said storage tank, and to act as a motor for subsequently accelerating the rotor, by accepting return flow of hydraulic fluid from said storage tank back to the reservoir.

2. The structure as claimed in claim 1 including a bleed-off valve means in said means for supplying motive fluid to the turbine, and means for simultaneously actuating said bleed-off valve means and said clutch means.

* * * * *